United States Patent [19]

Larsen

[11] Patent Number: 5,560,559

[45] Date of Patent: Oct. 1, 1996

[54] ACTUATION SYSTEM WITH ACTIVE COMPENSATION FOR TRANSIENT LOADS

[75] Inventor: Richard K. Larsen, Lahambra, Calif.

[73] Assignee: AlliedSignal, Inc., Morristown, N.J.

[21] Appl. No.: 269,817

[22] Filed: Jun. 30, 1994

[51] Int. Cl.$^6$ ........................................ B64C 15/02
[52] U.S. Cl. .................... 244/172; 244/52; 244/54; 60/204; 60/232
[58] Field of Search ............... 244/172, 52, 195, 244/17.27, 78, 54, 76 R; 318/203, 628, 646, 434, 566, 283, 286, 9, 10, 15, 611, 623; 89/1.809, 1.1; 60/204, 236; 239/265.35, 265.33, 265.19

[56] References Cited

U.S. PATENT DOCUMENTS

| | | |
|---|---|---|
| 2,621,005 | 12/1952 | Turpin . |
| 3,130,947 | 4/1964 | Franks . |
| 3,456,172 | 7/1969 | Hendrik et al. . |
| 3,549,107 | 12/1970 | Zimmer . |
| 3,568,929 | 7/1968 | Butter . |
| 3,634,746 | 1/1973 | Strege . |
| 3,957,260 | 5/1976 | Raymond et al. . |
| 3,984,071 | 10/1976 | Fleming . |
| 4,040,580 | 8/1977 | Schwaerzla ............................ 244/203 |
| 4,143,583 | 3/1979 | Bauer et al. . |
| 4,282,979 | 8/1981 | Friedrichs . |
| 4,355,358 | 10/1982 | Chelford et al. . |
| 4,396,171 | 8/1983 | Schultz . |
| 4,796,192 | 1/1989 | Lewis . |
| 4,864,882 | 9/1989 | Capewell ............................ 244/75 R |
| 4,913,379 | 4/1990 | Kubota et al. . |
| 5,115,710 | 5/1992 | Mitchell et al. .......................... 244/52 |
| 5,267,436 | 12/1993 | Wood, Jr. et al. ........................ 244/52 |
| 5,316,240 | 5/1994 | Girard et al. ........................ 244/17.27 |

*Primary Examiner*—Galen L. Barefoot
*Attorney, Agent, or Firm*—John R. Rafter

[57] ABSTRACT

A thrust-vectoring actuation system for a rocket nozzle is provided with a force sensor to enable detection of transient loads during startup and shutdown of a rocket engine. A motor responds to transient loads in excess of a predetermined threshold to drive the rocket nozzle in a direction of compliance with the transient loads.

8 Claims, 2 Drawing Sheets

ACTUATION SYSTEM WITH ACTIVE COMPENSATION FOR TRANSIENT LOADS

TECHNICAL FIELD

The present invention relates generally to thrust-vectoring actuation systems for rocket nozzles.

BACKGROUND OF THE INVENTION

It has been observed that thrust-vectoring actuation (TVA) systems for rockets are subjected to transient loads which accompany the startup and shutdown of rocket engines. These loads, which are transferred to the nozzle structure of the rocket via the TVA system, are unpredictable in terms of both amplitude and direction. However, the loads are sufficiently strong to raise concern about the possibility that the nozzle structure could yield under the influence of such loads, thereby putting the nozzle in an out-of-round condition.

The above-described loads are cyclic, and have frequencies which vary with the particular rocket in question. Available data indicate, for example, that the frequency can vary from about 4 Hz on the Centaur to about 12 Hz on the Titan IV. Accordingly, any system designed to compensate for the transient loads should have a response time which is sufficiently short in view of the applicable frequency.

This invention is directed to apparatus and methods for compensating for transient loads which tend to deform the nozzle or associated structure of a rocket, and which exceed normal operational loads. Objects and advantages of the invention will become apparent from the following description, which includes the appended claims and accompanying drawings.

SUMMARY OF THE INVENTION

The invention provides thrust-vectoring apparatus adapted to position a rocket nozzle that is operatively associated with a rocket engine, and comprises in combination: a bi-directional electric motor; an actuator shaft connected in driven relation to the motor and in driving relation to the nozzle; and means, connected to the shaft between the motor and the nozzle, for sensing a transient force associated with startup or shutdown of the engine.

In essence, the invention provides a method for preventing damage to the nozzle or associated structure, comprising the steps of sensing a transient force applied in the system between the nozzle and the motor, and when the transient force exceeds a predetermined threshold, activating the motor to drive the output shaft in a direction of compliance with respect to the transient force.

DESCRIPTION OF THE PREFERRED EMBODIMENT

Figure 1:
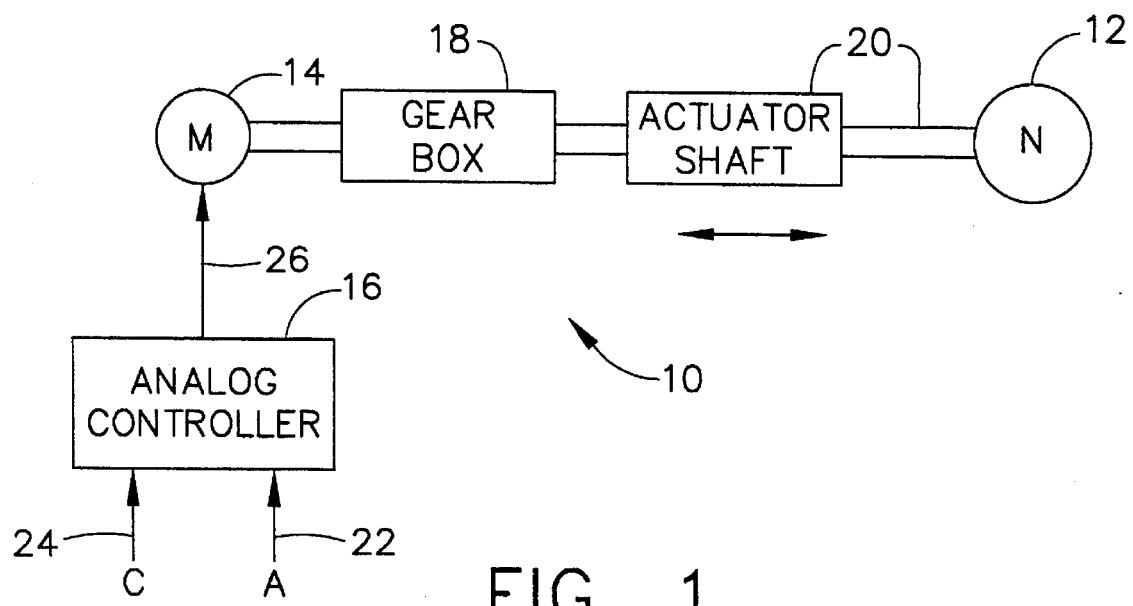
FIG. 1 is a schematic diagram of a conventional thrust-vectoring actuation system for controlling the position of a rocket nozzle.

FIG. 1 of the drawings depicts one of two legs of a conventional TVA control system 10 for a rocket nozzle 12. The second leg is identical to the illustrated leg but controls the nozzle 12 along a plane (into and out from the drawing) which is ninety degrees apart from the illustrated leg.

The illustrated leg includes a bi-directional electric motor 14 under the control of a conventional analog controller 16. The motor 14 is connected through a gearbox 18 to an actuator shaft 20. The actuator shaft 20 is connected at its opposite end to the rocket nozzle 12. As inputs, the controller 16 receives position feedback signals (signified by arrow 22 and indicative of the actual position of the nozzle) for each leg from conventional position sensors (not shown), and a commanded position signal (signified by arrow 24) from an electronic control system. As outputs, the controller 16 communicates control signals along a line 26 to each motor 14, and the motors collectively respond to position the nozzle 12 as needed.

Figure 2:
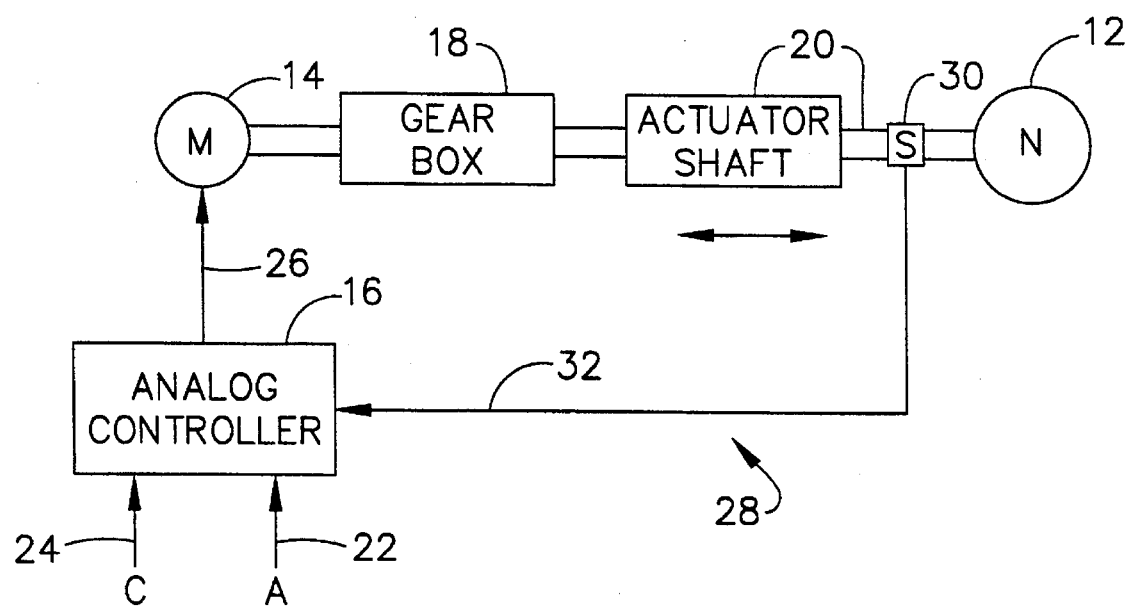
FIG. 2 is a schematic diagram of a thrust-vectoring actuation system in accord with the invention.

FIG. 2 illustrates a TVA control system 28 in accord with the invention. Otherwise conventional in structure, the system 28 of the present invention includes a force sensor 30, which may be provided in the form of a piezoelectric transducer or load cell, for example. The sensor 30 is connected in series with the actuator shaft 20 so that any force acting on and in the direction of the shaft will be sensed. Signals indicative of the force acting on the sensor 30 are communicated along a line 32 to the controller 16. The controller is adapted by conventional analog circuit elements—such as a deadband and appropriate amplification and filtering through which the signal on line 32 is processed before becoming an operative input to a summing junction which also receives an input indicative of the difference between the actual position on line 22 and the commanded position on line 24—to respond to the signals on line 32 only when the associated transient force exceeds a predetermined threshold in excess of the normal operational loads to which the shaft 20 is subjected. In that case, the controller communicates appropriate control signals to the motor 14, and the motor responds by driving the actuator shaft 20 in a direction of compliance with respect to the transient force. That is, if the force is compressive, the shaft is driven in a direction away from the nozzle 12, and if the force is tensile, the shaft is driven in a direction toward the nozzle.

Figure 3:
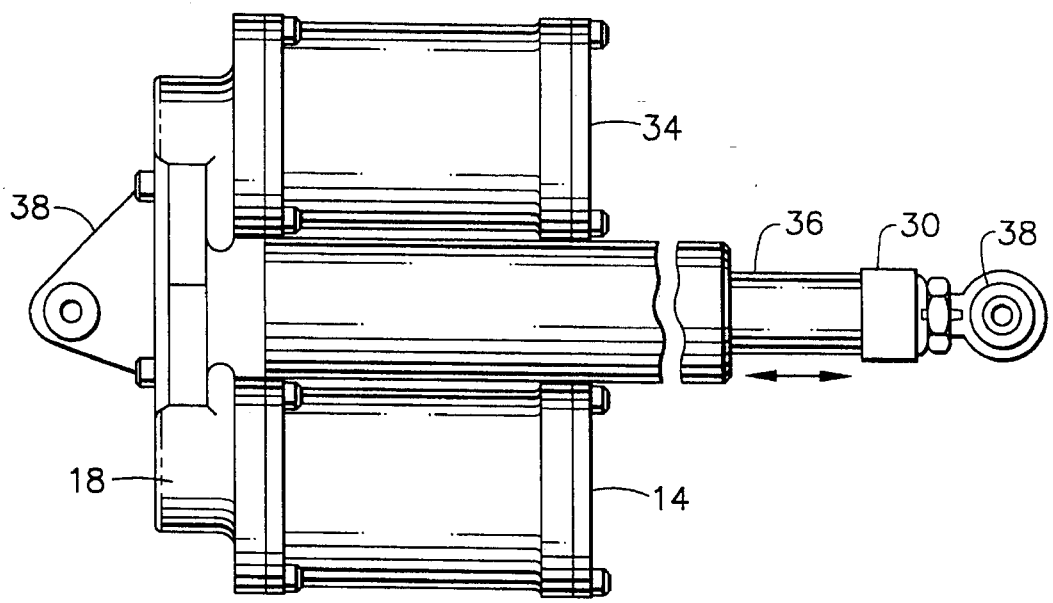
FIG. 3 is an elevational view of a preferred embodiment of the invention.

FIG. 3 illustrates a preferred embodiment of the invention. Two bi-directional, brushless DC motors 14, 34 are connected in driving relation to a gearbox. 18, which in turn is connected in driving relation to an actuator shaft 36. A load cell 30 is rigidly connected by any suitable means to the actuator shaft 36. Leads (not shown) are connected to the cell 30 for electrical communication to the controller 16 (FIG. 2). The shaft 36 terminates with a rod end bearing 38 which in use is connected to the nozzle 12 (FIG. 2), while the motors 14, 34 are connected via a bracket 38 to the outer structure of a rocket.

Figure 4:
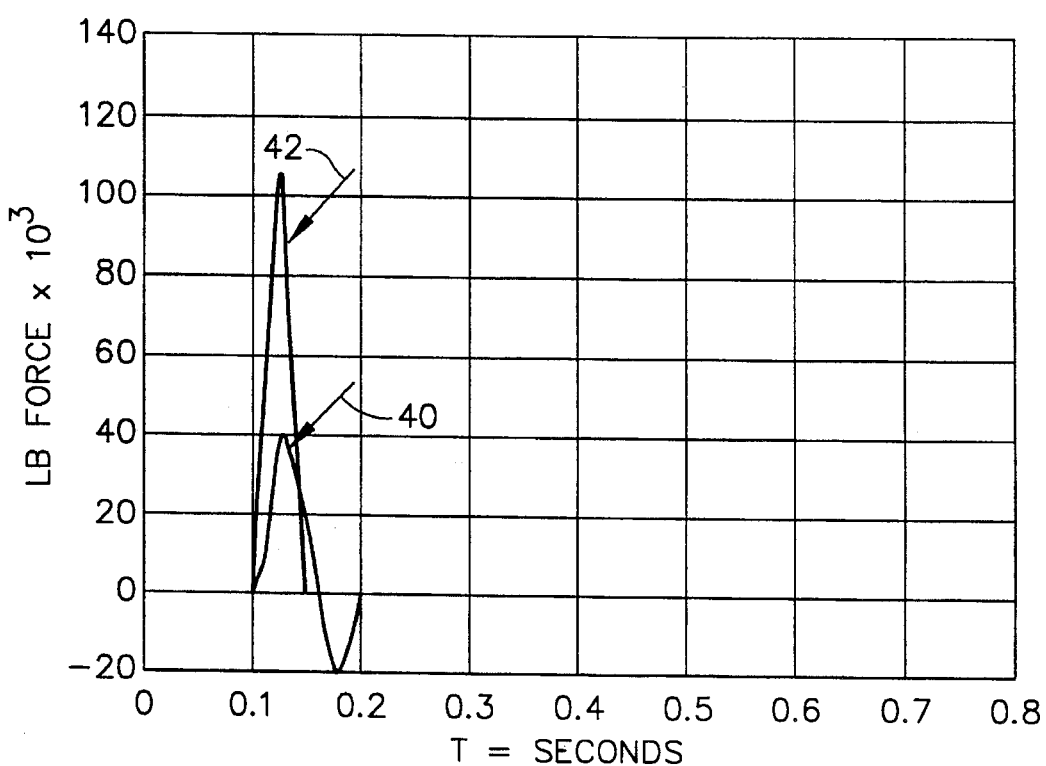
FIG. 4 is a comparative graph illustrating the degree of transient load compensation attainable by use of the invention.

FIG. 4 illustrates for a single pulse of force the extent of force compensation which can be achieved by the invention. Line 40 indicates the compensated load while line 42 indicates the uncompensated load on the actuator shaft.

Having described the preferred embodiment of the invention, it should be understood that the description is intended as illustrative, and is not intended to restrict the scope of the invention more than is indicated by the following claims:

What is claimed is:

1. Thrust-vectoring apparatus adapted to position a rocket nozzle that is operatively associated with a rocket engine, comprising in combination:

a bi-directional electric motor;

an actuator shaft connected in driven relation to the motor and in driving relation to the nozzle; and sensor means, connected to the shaft between the motor and the nozzle, for sensing a transient force associated with startup or shutdown of the engine for activating the motor to drive the actuator for drivingly adjusting the nozzle in a controlled manner.

2. Apparatus as recited in claim 1 wherein the sensor means comprises a load cell.

3. Apparatus as recited in claim 1 wherein the sensor means comprises a piezoelectric transducer.

4. Apparatus as recited in claim 1 further comprising analog controller means, responsive to a signal communicated from the sensor means, for activating the motor when the signal exceeds a predetermined threshold.

5. An apparatus as in claim 1 wherein the sensing of the transient force includes simultaneous sensing of the transient force.

6. An apparatus as in claim 1 wherein the motor drives the actuator shaft in a direction of compliance with respect to the transient force.

7. For use with a launch vehicle having a rocket nozzle connected to a thrust-vectoring control system, wherein the system includes a motor having an output shaft connected in driving relation to the nozzle, a method for preventing damage to the nozzle or associated structure, comprising the steps of:

sensing a transient force applied in the system between the nozzle and the motor: and when the transient force exceeds a predetermined threshold, activating the motor to drive the output shaft in a direction of compliance with respect to transient force.

8. A method as in claim 7 wherein the sensing of the transient force includes simultaneous sensing of the transient force.

* * * * *